(12) United States Patent
Yum et al.

(10) Patent No.: US 11,017,530 B2
(45) Date of Patent: May 25, 2021

(54) APPARATUS AND METHOD FOR ANALYZING CEPHALOMETRIC IMAGE

(71) Applicants: LaonPeople Inc., Seongnam-si (KR); Moon seop Yum, Seoul (KR)

(72) Inventors: Moon seop Yum, Seoul (KR); Tae Woong Kim, Seongnam-si (KR); Jae Min Park, Seongnam-si (KR); Suk Joong Lee, Seoul (KR); Sung Bae Park, Seongnam-si (KR)

(73) Assignee: LAONPEOPLE INC., Seoul (KR)

( * ) Notice: Subject to any disclaimer, the term of this patent is extended or adjusted under 35 U.S.C. 154(b) by 65 days.

(21) Appl. No.: 16/431,538

(22) Filed: Jun. 4, 2019

(65) Prior Publication Data

US 2020/0013162 A1 Jan. 9, 2020

(30) Foreign Application Priority Data

Jul. 9, 2018 (KR) .................. 10-2018-0079623
Oct. 25, 2018 (KR) .................. 10-2018-0128188

(51) Int. Cl.
*G06K 9/00* (2006.01)
*G06T 7/00* (2017.01)
(Continued)

(52) U.S. Cl.
CPC .............. *G06T 7/0012* (2013.01); *G06K 9/52* (2013.01); *G06N 20/00* (2019.01); *G06T 2207/20081* (2013.01); *G06T 2207/30196* (2013.01)

(58) Field of Classification Search
CPC ......... G06T 7/0012; G06T 2207/20081; G06T 2207/30196; G06T 2207/10116; G06T 2207/30036; G06T 7/60; G06T 7/11; G06T 2207/20084; G06T 2207/30016; G06N 20/00; G06K 9/52
See application file for complete search history.

(56) References Cited

U.S. PATENT DOCUMENTS

| 2009/0034813 A1 | 2/2009 | Dikmen et al. |
| 2010/0119137 A1* | 5/2010 | Schwing ............... G06K 9/6857 382/131 |

(Continued)

FOREIGN PATENT DOCUMENTS

| JP | 2017-520292 A | 7/2017 |
| KR | 10-2000-0054062 A | 9/2000 |
| KR | 10-2014-0114308 A | 9/2014 |

OTHER PUBLICATIONS

Hansang Lee et al., "Cephalometric landmark detection in dental x-ray images using convolutional neural networks", Progress in Biomedical Optics and Imaging, SPIE—International Society for Optical Engineering, Mar. 3, 2017, vol. 10134, Bellingham, WA, US.

(Continued)

*Primary Examiner* — Dhaval V Patel
(74) *Attorney, Agent, or Firm* — KORUS Patent, LLC; Seong Il Jeong

(57) ABSTRACT

Disclosed herein are an apparatus and method for analyzing a cephalometric image. The apparatus for analyzing a cephalometric image includes a control unit configured to extract a landmark point on a cephalometric image and to generate an analysis image, and memory configured to store the generated analysis image.

8 Claims, 8 Drawing Sheets

(51) Int. Cl.
  *G06N 20/00* (2019.01)
  *G06K 9/52* (2006.01)

(56) References Cited

U.S. PATENT DOCUMENTS

2016/0063720 A1* 3/2016 Han ........................ G06T 7/10
                                                       382/131
2018/0061054 A1* 3/2018 Abraham ............... A61B 6/501

OTHER PUBLICATIONS

Rosalia Leonardi et al., "An Evaluation of Cellular neural Networks for the Automatic Identification of Cephalometric Landmarks on Digital Images", Journal of Biomedicine and Biotechnology, Jan. 2009, vol. 2009, Hindawi Publishing Corporation.

Anonymous, "Cephalometric analysis", Wikipedia, Apr. 19, 2018, pp. 1-19, XPO55616339, Retrieved from the Internet : URL https://en.wikipedia.org/wiki/index.php?title=Cephalometric_analysis&oldid=837161275 [retrieved on Aug. 29, 2019].

Russakovsky Olga et al., "ImageNet Large Scale Visual Recognition Challenge", International Journal of Computer Vision, Apr. 11, 2015, pp. 211-252, vol. 115, No. 3, Kluwer Academic Publishers, Norwell, U.S., XP035934552, ISSN: 0920-5691, DOI: 10.10071511263-015-0816-Y [retrieved on Apr. 11, 2015].

Rémy Vandaele et al., "Landmark detection in 2D bioimages for geometric morphometrics: a multi-resolution tree-based approach", Scientific Reports, Jan. 11, 2018, vol. 8, No. 1, XP055768420, DOI: 10.1038/s41598-017-18993-5.

* cited by examiner

APPARATUS AND METHOD FOR ANALYZING CEPHALOMETRIC IMAGE

CROSS-REFERENCE TO RELATED APPLICATION

This application claims the benefit of Korean Patent Application Nos. 10-2018-0079623 and 10-2018-0128188 filed on Jul. 9, 2018 and Oct. 25, 2018, respectively, which are hereby incorporated by reference herein in its entirety.

BACKGROUND

1. Technical Field

Embodiments disclosed herein relate generally to an apparatus and method for analyzing a cephalometric image, and more specifically to an apparatus and method that analyze an image of the head of a patient measured for dental, orthognathic, or facial cosmetic surgery.

2. Description of the Related Art

For dental, orthognathic, or facial cosmetic surgery, there is required data that is acquired by analyzing the skull or face of a patient. For this purpose, conventionally, before a doctor performs an operation, a medical team analyzes an image acquired by imaging the head of a patient by means of an X-ray machine or computed tomography (CT) scanner, and determines an expected operation site for the patient via an analysis file. In this case, the medical team analyzes the image by using a method of marking important points. This analysis method is based on the experience of a medical team accumulated over a long period of time.

However, this method requires a medical team to directly select points, and thus it is difficult to acquire analysis data in real time. Accordingly, a problem arises in that it takes a long time for the medical team to notify a patient of accurate diagnostic results. Furthermore, the method is dependent on the experience of a medical team. Accordingly, when a medical team other than a skilled medical team selects points, the points may be erroneously selected, and thus distorted analysis data may be generated. As a result, a problem arises in that an operation may be performed based on the erroneous analysis data.

In connection with this, Korean Patent Application Publication No. 10-2000-0054062 discloses a technology that digitizes all types of information, such as the results of the diagnosis of a patient, etc., and enables a doctor to conveniently carry out medical treatment in an Internet-accessible place, such as a home, an office, or the like. However, this publication does not disclose a technology that provides the results of the analysis of a medical image to a medical team, thereby enabling the medical team to provide improved medical service to a patient. Therefore, there is a need for a technology for overcoming the above-described problems.

Meanwhile, the above-described related art corresponds to technical information that has been possessed by the present inventor in order to contrive the present invention or that has been acquired during a process of contriving the present invention, and cannot be necessarily viewed as well-known technology that has been known to the public before the filing of the present application.

SUMMARY

Embodiments disclosed herein propose an apparatus and method for analyzing a cephalometric image.

Embodiments disclosed herein propose an apparatus and method for analyzing a cephalometric image, which provide accurate analysis results based on a cephalometric image.

Embodiments disclosed herein propose an apparatus and method for analyzing a cephalometric image, which rapidly provide the results of the analysis of a cephalometric image.

Embodiments disclosed herein propose an apparatus and method for analyzing a cephalometric image, which provide a report easily understandable by not only a medical team but also a patient by processing the results of the analysis of a cephalometric image once.

According to an aspect of the present invention, there is provided an apparatus for analyzing a cephalometric image, the apparatus including: a control unit configured to extract a landmark point on a cephalometric image, and to generate an analysis image; and memory configured to store the generated analysis image.

According to another aspect of the present invention, there is provided a method by which an apparatus for analyzing a cephalometric image analyzes a cephalometric image, the method including: extracting a landmark point on a cephalometric image; and generating an analysis image based on the extracted landmark point.

According to another aspect of the present invention, there is provided a computer-readable storage medium having stored thereon a computer program that, when executed by a processor, causes the processor to execute a method of analyzing a cephalometric image, wherein the method includes extracting a landmark point on a cephalometric image and generating an analysis image based on the extracted landmark point.

BRIEF DESCRIPTION OF THE DRAWINGS

The above and other objects, features, and advantages of the present invention will be more clearly understood from the following detailed description taken in conjunction with the accompanying drawings, in which.

DETAILED DESCRIPTION

Various embodiments will be described in detail below with reference to the accompanying drawings. The following embodiments may be modified and practiced in various different forms. In order to more clearly describe the features of the embodiments, detailed descriptions of items well known to those having ordinary knowledge in the art to which the embodiments pertain will be omitted. Furthermore, parts unrelated to descriptions of the embodiments will be omitted in the accompanying drawings, and similar reference symbols will be assigned to similar parts throughout the specification.

Throughout the specification, when a component is described as being "connected to another component," this includes not only a case where they are "directly connected to each other" but also a case where they are "connected to each other with a third component interposed therebetween." Furthermore, when a component is described as "including" another component, this means that a third component is not excluded but may be further included, unless particularly described to the contrary.

Embodiments of the present invention will be described in detail below with reference to the accompanying drawings.

Prior to the following description, the meanings of the terms that will be used below are defined first.

The term "cephalometric image" refers to an image of the skull or face of a patient. A cephalometric image may be used for the observation or measurement of the head of a patient. For example, a cephalometric image may show the locations of the anatomical portions of a head or the dimensions of the anatomical portions.

Although a cephalometric image may be usually acquired by imaging the front or side surface of the head of a patient by means of radiography or computed tomography (CT), a method of acquiring a cephalometric image is not limited thereto. Furthermore, a cephalometric image may be a two-dimensional image or three-dimensional image.

The terms requiring descriptions, other than the terms defined above, will be described below separately.

Figure 1:
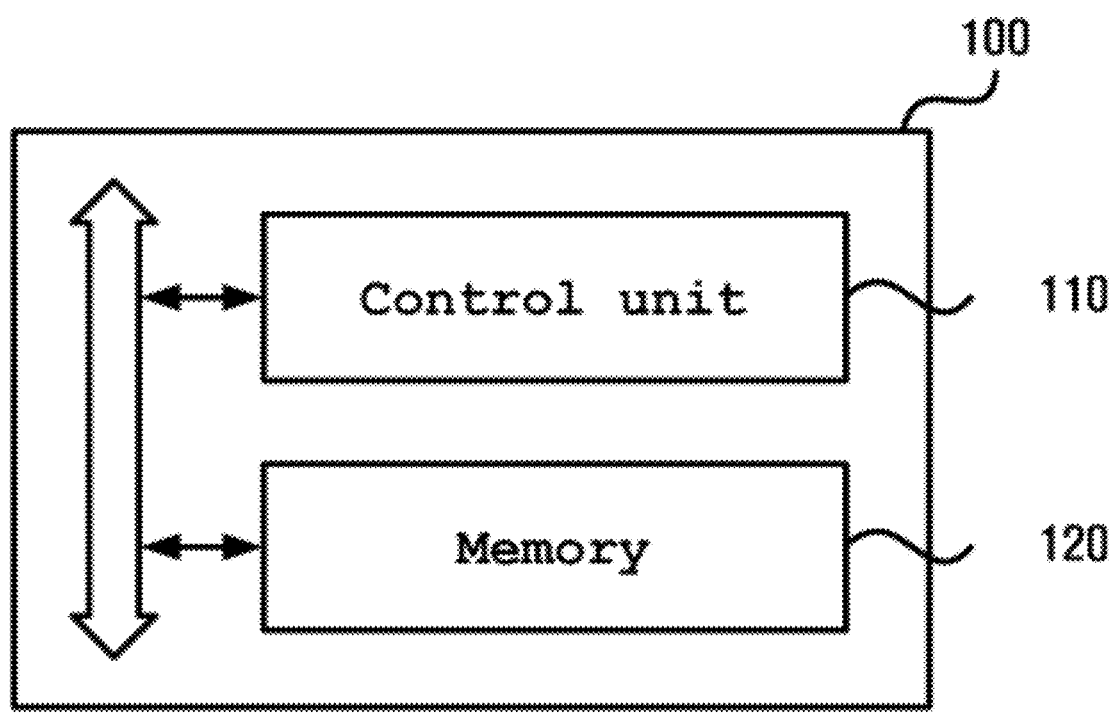
FIGS. 1 and 2 are block diagrams illustrating apparatuses for analyzing a cephalometric image according to some embodiments.
Figure 2:
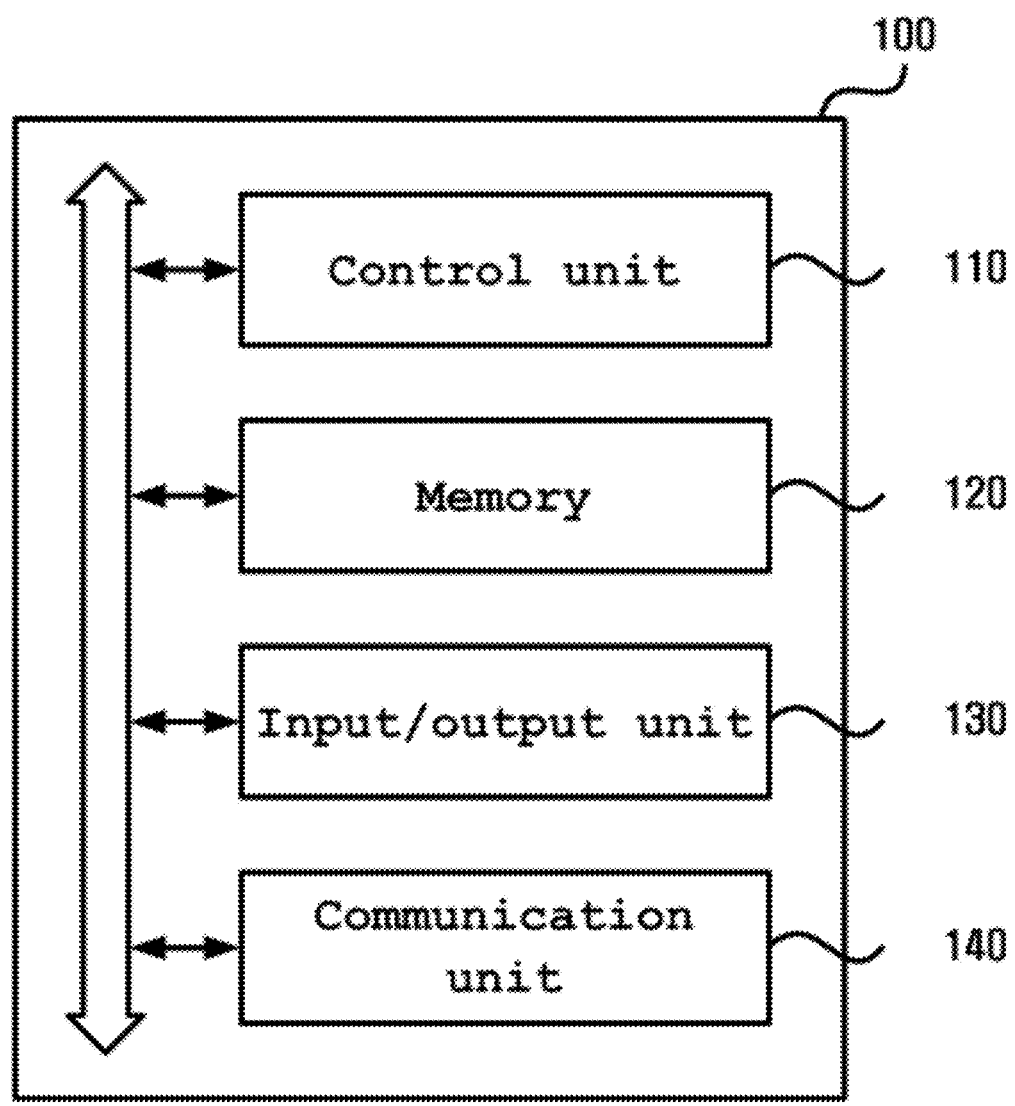

FIGS. 1 and 2 are block diagrams illustrating apparatuses 100 for analyzing a cephalometric image according to some embodiments.

The apparatuses 100 for analyzing a cephalometric image may generate an analysis image in which an acquired cephalometric image is combined with an identification image.

Each of the apparatuses 100 for analyzing a cephalometric image may be implemented as an electronic terminal or as a server-client system (or a cloud system). The system may include an electronic terminal on which an online service application for interaction with a user is installed.

In this case, the electronic terminal may be implemented as a computer, a portable terminal, a television, a wearable device, or the like that can be connected to a remote server over a network or that can access another terminal or a server. In this case, the computer may include, for example, a notebook, a desktop, and a laptop on which a web browser has been installed. The portable terminal is, for example, a wireless communication device ensuring portability and mobility, and may include all types of handheld wireless communication devices, such as a Personal Communication System (PCS) terminal, a Personal Digital Cellular (PDC) terminal, a Personal Handyphone System (PHS) terminal, a Personal Digital Assistant (PDA), a Global System for Mobile communications (GSM) terminal, an International Mobile Telecommunication (IMT)-2000 terminal, a Code Division Multiple Access (CDMA)-2000 terminal, a W-Code Division Multiple Access (W-CDMA) terminal, a Wireless Broadband (Wibro) Internet terminal, a smartphone, and a Mobile Worldwide Interoperability for Microwave Access (mobile WiMAX) terminal. Furthermore, the television may include an Internet Protocol Television (IPTV), an Internet Television (Internet TV), a terrestrial TV, a cable TV, etc. Furthermore, the wearable device is, for example, an information processing device of a type that can be directly worn on a human body, such as a watch, glasses, an accessory, a dress, shoes, or the like, and may access a remote server or connect with another terminal over a network directly or by way of another information processing device.

An apparatus 100 for analyzing a cephalometric image according to an embodiment may include a control unit 110 and memory 120.

The control unit 110 controls the overall operation of the apparatus 100 for analyzing a cephalometric image, and may include a processor, such as a CPU or the like. For example, the control unit 110 may control other components included in the apparatus 100 for analyzing a cephalometric image so that they perform an operation corresponding to user input received via an input/output unit.

For example, the control unit 110 may execute a program stored in the memory 120, may read a file stored in the memory 120, or may store a new file in the memory 120.

According to the embodiments described herein, the control unit 110 may acquire a cephalometric image.

For example, the control unit 110 may acquire a cephalometric image from an apparatus (not shown) capable of radiography or computed tomography scan for a head because it includes the apparatus or is communicating with the apparatus.

According to another embodiment, the control unit 110 may determine that a preprocessed image is acquired as a cephalometric image after preprocessing an acquired image.

For example, the control unit 110 may preprocess an acquired image by applying CLAHE parameters, a Gaussian blur, or warping to the acquired image, scaling the acquired image in the X and/or Y axes, reducing or cropping a learning image, increasing resolution by changing pixel values, or performing the like.

Furthermore, according to another embodiment, when the acquired image is a raw image, the control unit 110 may acquire a cephalometric image from the raw image. For this purpose, the control unit 110 may preprocess the raw image.

In connection with this, the raw image is an image including a cephalometric image. For example, the raw image may be an image including not only a cephalometric image but also an image of another body part of a patient, such as an X-ray image of the upper half of the body of a patient.

The control unit 110 may search for whether or not a predetermined identifier is located within a predetermined area on the raw image. For example, the control unit 110 may search for whether or not a predetermined identifier recognized as an "eye socket" is located within a predetermined area on the raw image. In this case, the apparatus 100 for analyzing a cephalometric image may set an area within a window, composed of a closed curve having a specific size and shape, as the predetermined area when the window is located on the raw image. The window may set various ranges of areas while moving across the raw image.

Furthermore, for example, the apparatus 100 for analyzing a cephalometric image may use machine learning (or deep learning, or a convolutional neural network (CNN)) in order to search for whether or not a predetermined identifier is located within a predetermined area on the raw image. For example, the apparatus 100 for analyzing a cephalometric image may extract a coordinate at which an identifier is located within a predetermined area by applying a CNN to the predetermined area. The coordinate may include one or more coordinates, and may be a coordinate within the predetermined area or a coordinate on the raw image.

The control unit 110 that has extracted the coordinate of the predetermined identifier on the raw image may acquire a cephalometric image based on the extracted coordinate.

For example, the control unit 110 may extract three identifiers corresponding to "an eye socket," "the low jawbone," and "the nasal cavity," used to identify a cephalometric image, from the raw image. To extract the three identifiers, the control unit 110 may extract coordinates corresponding to the identifiers while moving the window. Furthermore, the control unit 110 may acquire a cephalometric image by setting an area, determined to be a cephalometric image, on the raw image based on the extracted coordinates. For example, the apparatus 100 for analyzing a cephalometric image may set an area, including not only the three identifiers but also predetermined ranges around the respective identifiers, as the cephalometric image.

In this case, the three identifiers are merely an example, and the number of identifiers is not limited. In connection with this, although each of the identifiers may include a single coordinate, it may include a plurality of coordinates and correspond to a specific body organ. Accordingly, the identifier may be, for example, the center point of "an eye socket," or may be a body organ itself, such as "an eye socket," "a nose," "the first vertebra," "a chin," or the like.

The control unit 110 may process the cephalometric image through the normalization of the acquired cephalometric image so that the extraction of a landmark point is facilitated. In other words, since the control unit 110 has performed learning based on a learning image, the control unit 110 may normalize the cephalometric image so that the value of the cephalometric image becomes the same as or similar to a value set for the learning image. For example, the apparatus 100 for analyzing a cephalometric image may perform normalization by changing the resolution, brightness, or the like of the cephalometric image, increasing or reducing the size of the cephalometric image, or performing the like. The control unit 110 may determine the normalized cephalometric image to be the acquired cephalometric image.

When it is determined that the cephalometric image has been acquired as described above, the control unit 110 may extract a landmark point on the cephalometric image.

In this case, the "landmark point" is a point that a medical team needs to become aware of in order to practice orthodontic or orthognathic surgery, or the like, and refers to a point of interest identified on a cephalometric image of a patient. The landmark point is used as a reference point for the determination of the cephalometric state of a patient through various types of combination. According to the related technology, a skilled medical team directly marks a landmark point on a cephalometric image. In contrast, according to the embodiment described herein, the apparatus 100 for analyzing a cephalometric image may extract a landmark point from a cephalometric image.

According to an embodiment, the control unit 110 may extract the landmark point on the cephalometric image through geometric computation. In other words, a landmark point having no feature point on the cephalometric image or a landmark point geometrically defined on the cephalometric image may be extracted through geometric computation. For example, a point obtained by computing the bisection point of the mandibular plane and a ramus may be extracted as a landmark point for a gonion.

According to another embodiment, the control unit 110 may extract the landmark point on the cephalometric image by using machine learning.

According to another embodiment, the control unit 110 may extract the landmark point on the cephalometric image by using deep learning.

According to another embodiment, the control unit 110 may extract the landmark point on the cephalometric image by using a CNN. For this purpose, the apparatus 100 for analyzing a cephalometric image may acquire one or more cephalometric images on each of which a landmark point is indicated, may train a CNN with the one or more images, and may extract the landmark point on the cephalometric image by means of the learned CNN.

For this purpose, for example, the control unit 110 may acquire a global feature by repeating the steps of creating a feature map from an image, acquired for the learning of a CNN, through convolution, acquiring a feature by performing convolution and subsampling again on a feature acquired by performing convolution and subsampling a local feature acquired through the subsampling of the feature map, and performing convolution and subsampling again on the acquired feature, and may provide the acquired global feature as input to a general neural network (a fully connected network), thereby achieving an optimum recognition result.

In other words, in order to extract the landmark point on the cephalometric image as described above, the control unit 110 may perform learning by using at least one learning image on which a landmark point is indicated (or in which an identification image is combined with a landmark point). For the above-described CNN learning, the learning image may be preprocessed. For example, CLAHE parameters, a Gaussian blur, or warping may be applied to the learning image, the learning image may be scaled in the X axis and/or the Y axis, the learning image may be reduced or cropped, resolution may be increased by changing pixel values, or the like may be performed.

Furthermore, the control unit 110 may extract the landmark point on the cephalometric image by performing segmentation by using, for example, a CNN. Segmentation is a technique for identifying a meaningful portion on a cephalometric image. Known various types of segmentation may be applied to the embodiments described herein. For example, the distribution of pixels may be determined using a histogram, a threshold value having an optimal value may be set, and identification may be performed on a per-pixel basis. Alternatively, significant edges may be extracted, and then identification may be performed. Alternatively, an area having homogeneity may be identified.

According to still another embodiment, the control unit 110 may set an area of interest on a cephalometric image, and may extract a landmark point within the area of interest. The apparatus 100 for analyzing a cephalometric image may use machine learning (or deep learning, or a CNN) in order to set an area of interest, and may use machine learning (or deep learning, or a CNN) in order to extract a landmark point within the area of interest.

Figure 3:
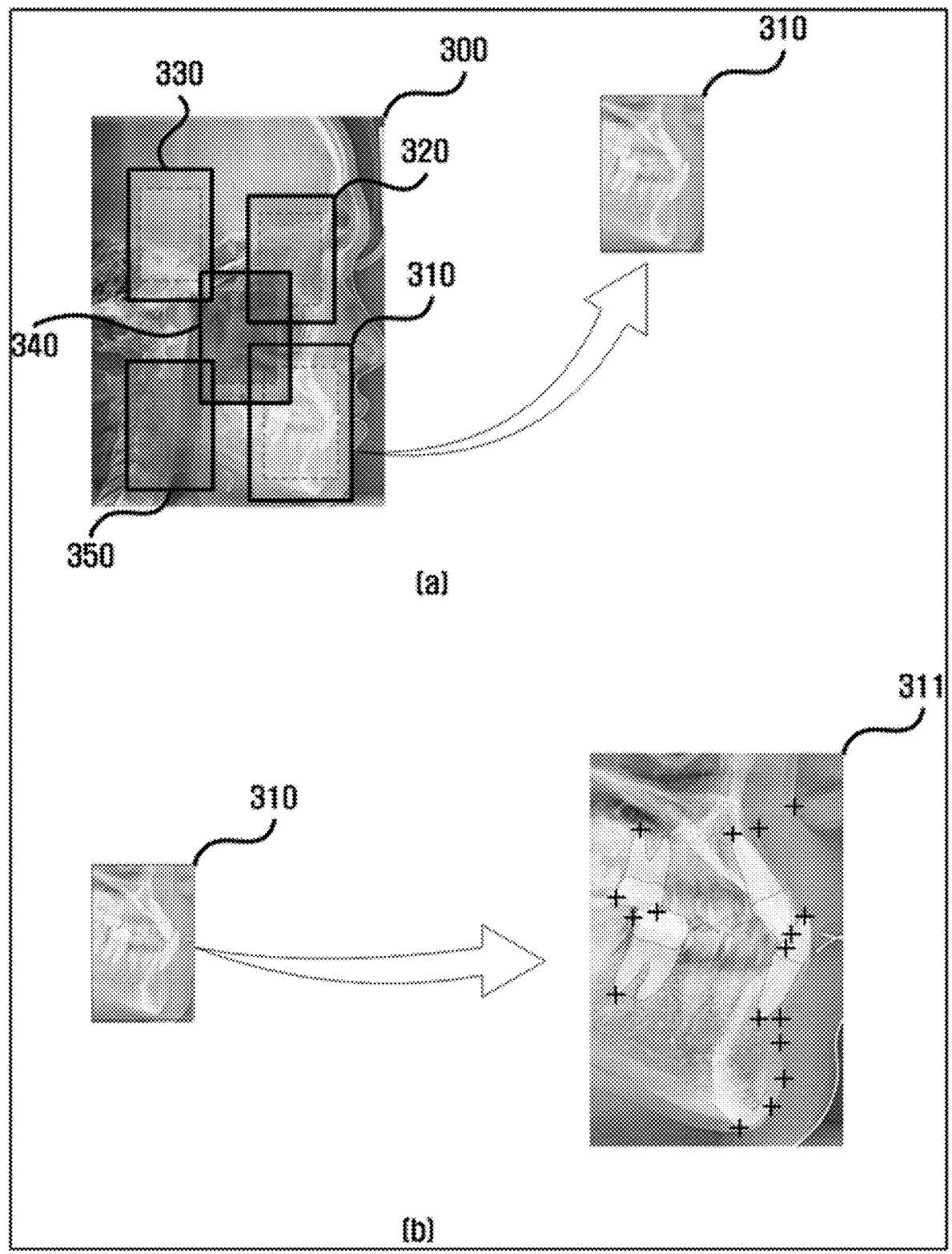
FIG. 3 is a reference view illustrating the apparatuses for analyzing a cephalometric image according to the embodiments.

In connection with this, FIG. 3 is a view illustrating an example of an operation by which the apparatus 100 for analyzing a cephalometric image sets an area of interest on a cephalometric image and extracts a landmark point.

As shown in FIG. 3(*a*), the apparatus 100 for analyzing a cephalometric image may set one or more areas of interest 310, 320, 330, 340 and 350 on a cephalometric image 300. These areas of interest 310, 320, 330, 340 and 350 may have different shapes or sizes, or may have the same shape or size.

When setting the areas of interest 310, 320, 330, 340 and 350, the apparatus 100 for analyzing a cephalometric image may detect an area, determined to be a medically important point, by using machine learning. In other words, a location of interest may be identified using machine learning, and may be marked with a bounding box. For example, the apparatus 100 for analyzing a cephalometric image may detect an area, determined to be "a chin," by using machine learning, and may set an area around the chin as an area of interest. Known technologies related to the detection may be applied to the embodiments described herein. Furthermore, when setting the areas of interest 310, 320, 330, 340 and 350, the apparatus 100 for analyzing a cephalometric image may set an area within a window as an area of interest when locating the window on the cephalometric image 300. Accordingly, the apparatus 100 for analyzing a cephalometric image may set an area within a designated range as an area of interest by changing the area of interest while moving a window or by locating the window at a fixed location.

In this case, as shown as FIG. 3(*a*), there may be defined an area of interest within solid lines and a sub-area of interest surrounded by dotted lines within the area of interest. The sub-area of interest is an area that is determined to be an important point for the acquisition of a landmark point. For example, a gonion or an area around the gonion, which is an important point, may be set as the sub-area of interest. An area of interest surrounding the sub-area of interest may be additionally set based on the center point of the sub-area of interest. Via this operation, errors in extracting landmark points, which are attributable to the erroneous setting of areas of interest, may be minimized, and thus landmark points may be more accurately extracted.

Landmark points may be extracted from the areas of interest set as described above. A learning model for points to be extracted as landmark points is provided. Accordingly, a probability image map may be generated by performing segmentation by means of the model, blobs may be set on the generated probability map, and the center points of the blobs may be extracted as landmark points. This extraction of landmark points may be performed on the areas of interest 310, 320, 330, 340 and 350. For example, for the area of interest 310 of FIG. 3(*a*) shown as an excerpt, a landmark point may be extracted, as shown in the area of interest 311 of FIG. 3(*b*). The landmark points extracted as described above may have high-level accuracy.

As described above, important analysis target portions on a cephalometric image may be set as areas of interest by using machine learning (or deep learning, or a CNN), and landmark points within the areas of interest may be extracted. As a result, the problem in which it is difficult to extract landmark points when the angle or location of a cephalometric image is not aligned is overcome, and thus landmark points may be rapidly and accurately extracted.

Meanwhile, according to another embodiment, the control unit 110 may extract a desired landmark point by using both machine learning (or deep learning, or a CNN) and geometric computation. Accordingly, for example, when it is necessary that a gonion is extracted as a landmark point, the control unit 110 may determine one of the point extracted through machine learning and the point extracted through geometric computation to be a gonion. For example, the control unit 110 may extract the point acquired through geometric computation as a gonion when the reliability of the landmark point extracted using machine learning is lower than or equal to a predetermined value.

Furthermore, according to another embodiment, when extracting a landmark point, the control unit 110 may verify a point, extracted using machine learning (or deep learning, or a CNN), by using geometric computation.

In this case, the landmark point extracted using machine learning may be verified by determining whether or not the landmark point is the same as the point extracted using geometric computation. Furthermore, whether a point or organ structure is located near the landmark point extracted using machine learning may be verified using geometric computation. During this process, the reliability of relative locations to points corresponding to a point or organ structure near the landmark point may be obtained using a Bayesian method (or a likelihood maximization method). For example, whether a landmark point extracted as the portion of the external auditory meatus is located at a location on the left of and above an articulare between the posterior cranial base surface and the condylar head or neck may be verified, and the result of the verification may be represented in terms of reliability. Furthermore, the size of the landmark point extracted using machine learning may be verified using geometric computation. Furthermore, whether a specific point or organ structure is located near the landmark point extracted using machine learning may be verified by computing the size of the specific point (a size relative to that of another point, or absolute size) or the size of the organ structure (a size relative to that of another organ, or absolute size).

Furthermore, according to another embodiment, the control unit 110 may extract a desired landmark point by using geometric computation, and may verify the extracted point by using machine learning (or deep learning, or a CNN).

For example, the control unit 110 may geometrically extract a gonion by extracting a point, obtained by computing the bisection point of the mandibular plane and a ramus, as a landmark point for the gonion, and may verify whether the extracted point is the gonion by performing analysis using machine learning on an area around the extracted point.

Additionally, the control unit 110 may verify whether the area of interest has been correctly set by using machine learning (or deep learning, or a CNN) or geometric computation. For example, the control unit 110 may verify whether the area of interest extracted by the detection of machine learning is an intended area of interest by classifying an image of the area of interest, or may represent whether or not an area of interest extracted by the detection of machine learning is an intended area of interest in terms of reliability. Alternatively, for example, the control unit 110 may verify whether an area of interest extracted by the detection of machine learning is an intended area of interest by using a point or organ structure near the area of interest.

As described above, the accuracy and reliability of the extracted landmark point may be increased by performing both machine learning and geometric computation. Meanwhile, when extracting the landmark point on the cephalometric image as described above, the control unit 110 may generate an analysis image by combining the landmark point with an identification image.

In other words, the control unit 110 may combine the cephalometric image with an identification image when converting the cephalometric image into the analysis image, and may combine the landmark point with the identification image when combining the cephalometric image with the identification image.

Meanwhile, the control unit 110 may provide the analysis image to a user. Additionally, the control unit 110 may determine whether to provide a report including the analysis image.

In this case, according to an embodiment, the control unit 110 may generate and provide a report so that the analysis image itself constitutes part of the report.

According to still another embodiment, the control unit 110 may provide a report obtained by processing the analysis image.

Meanwhile, various types of data, such as a file, an application, a program, etc., may be installed on and stored in the memory 120. The control unit 110 may access and use the data stored in the memory 120, or may store new data in the memory 120. Furthermore, the control unit 110 may execute a program installed on the memory 120. Referring back to FIG. 1, a computer-readable program for performing a method of analyzing a cephalometric image may be installed on the memory 120. Furthermore, an identification image used to analyze a cephalometric image and an analysis image or report based on the performance of the analysis of a cephalometric image may be stored in the memory 120.

According to an embodiment, when receiving input requesting the analysis of a cephalometric image from a user, the control unit 110 performs the analysis of the cephalometric image by executing the computer-readable program for performing a method of analyzing a cephalometric image, which has been installed on the memory 120.

Meanwhile, as shown in FIG. 2, an apparatus 100 for analyzing a cephalometric image according to another embodiment may further include an input/output unit 130.

The input/output unit 130 may include various types of components configured to support input/output intended to acquire a cephalometric image or to provide an analysis image to a user. The input/output unit 130 may include an input unit configured to receive input from a user, and an output unit configured to display information, such as the result of the performance of work, the state of the apparatus 100 for analyzing a cephalometric image, or the like. For example, the input/output unit 130 may include an operation panel configured to receive user input and a display panel configured to display a screen.

More specifically, the input unit may include various types of devices capable of receiving user input, such as a keyboard, physical buttons, a touch screen, a camera, a microphone, etc. Furthermore, the output unit may include a display panel, a speaker, etc. However, the input/output unit 110 is not limited thereto, but may include various types of components configured to support input/output.

Meanwhile, the apparatus 100 for analyzing a cephalometric image according to the present embodiment may further include a communication unit 140.

The communication unit 140 may perform wired/wireless communication with another device or a network. For this purpose, the communication unit 140 may include a communication module configured to support at least one of various wired/wireless communication methods. For example, the communication module may be implemented in the form of a chipset.

The wireless communication supported by the communication unit 140 may be, for example, Wireless Fidelity (Wi-Fi), Wi-Fi Direct, Bluetooth, Ultra Wide Band (UWB), Near Field Communication (NFC), or the like. Furthermore, the wired communication supported by the communication unit 140 may be, for example, USB, High Definition Multimedia Interface (HDMI), or the like.

Figure 4:
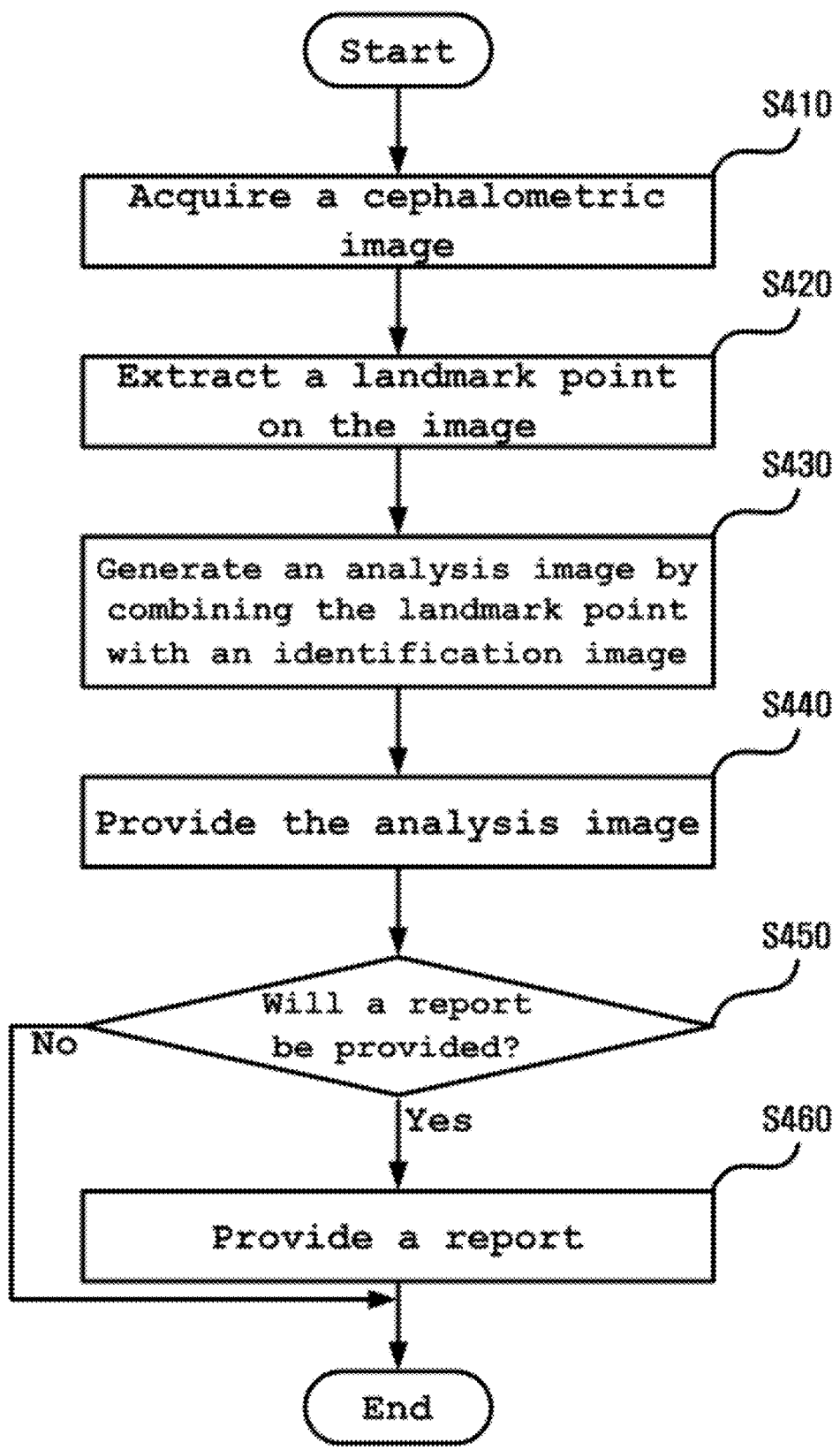
FIGS. 4 to 6 are flowcharts illustrating methods of analyzing a cephalometric image according to some embodiments.
Figure 5:
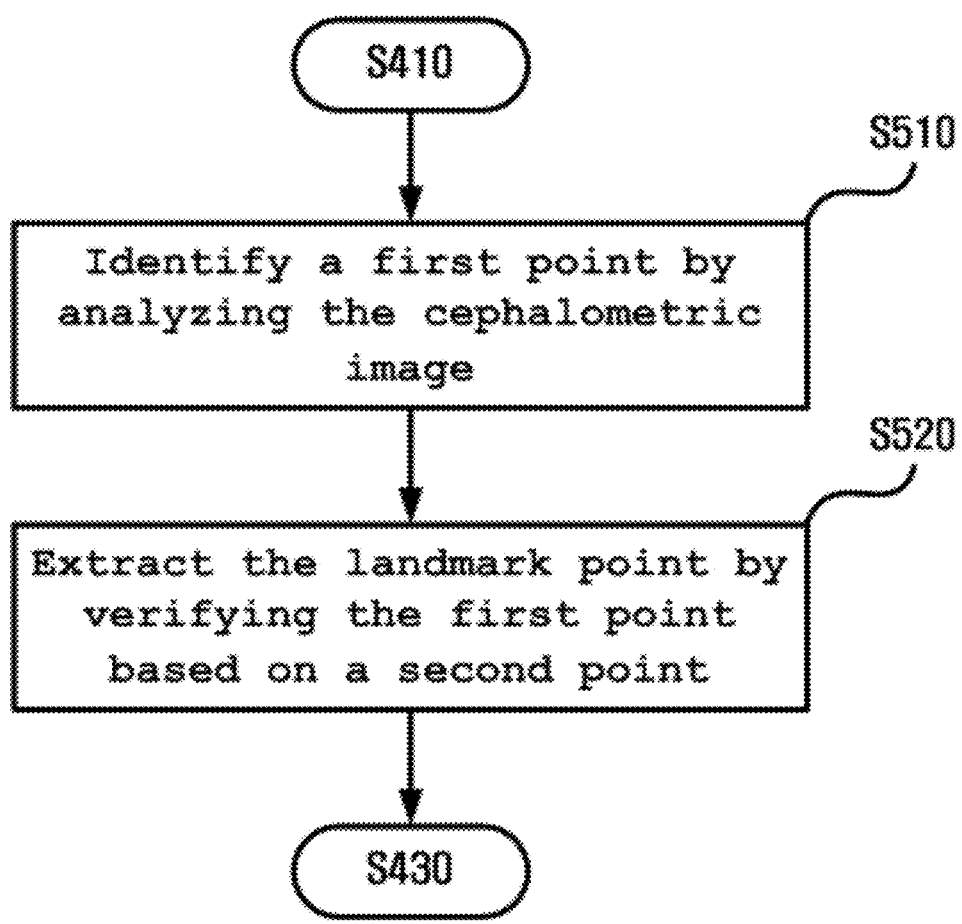
Figure 6:
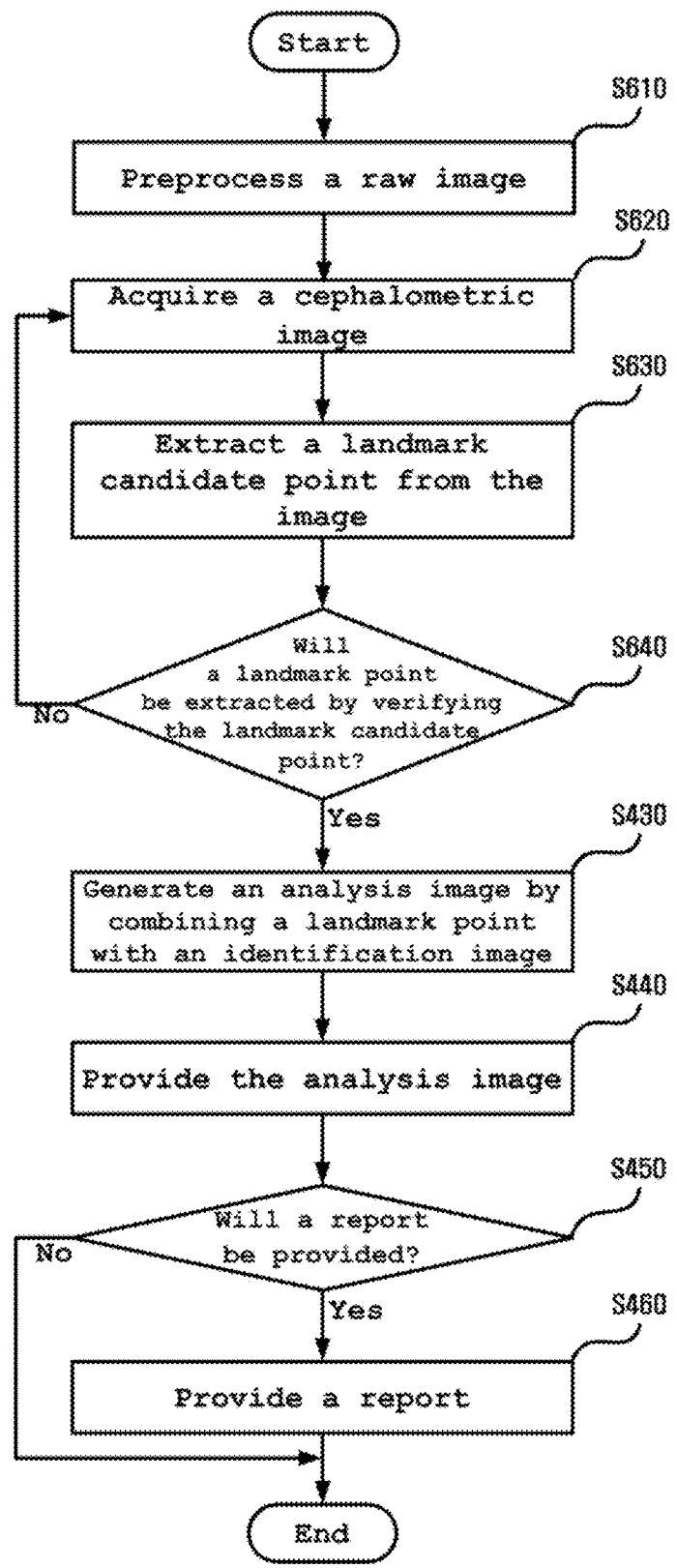

FIGS. 4 to 6 are flowcharts illustrating methods of analyzing a cephalometric image according to some embodiments.

The methods of analyzing a cephalometric image according to the embodiments, which are shown in FIGS. 4 to 6, include steps that are performed in a time-series manner in the apparatuses 100 for analyzing a cephalometric image, which are shown in FIG. 1 or 2. Accordingly, the descriptions that will be omitted below but have been given above in conjunction with the apparatuses 100 for analyzing a cephalometric image, which are shown in FIG. 1 or 2, may be also applied to the methods of analyzing a cephalometric image according to the embodiments, which are shown in FIGS. 4 to 6.

Figure 7:
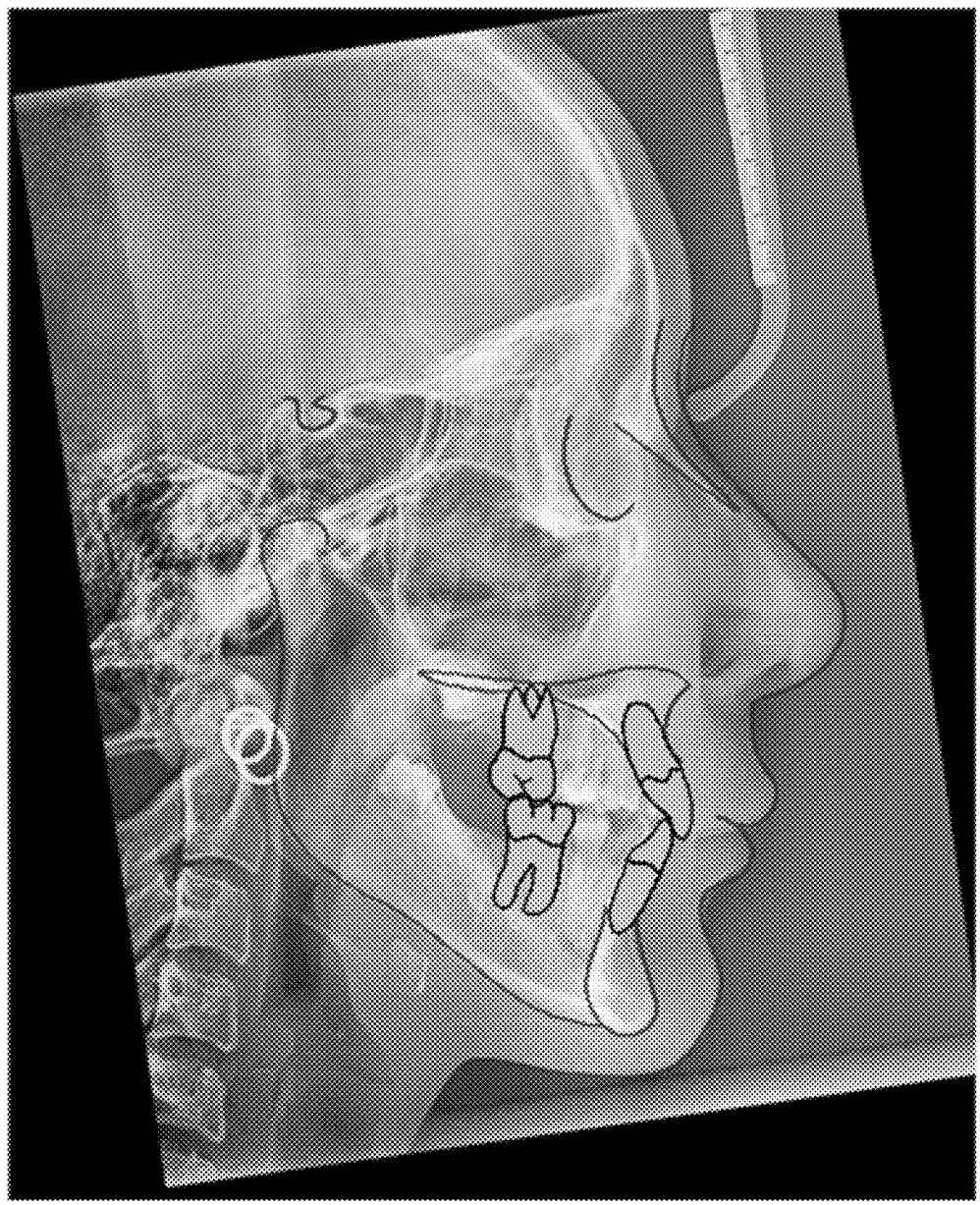
FIGS. 7 and 8 are reference views illustrating the methods of analyzing a cephalometric image according to the embodiments.
Figure 8:
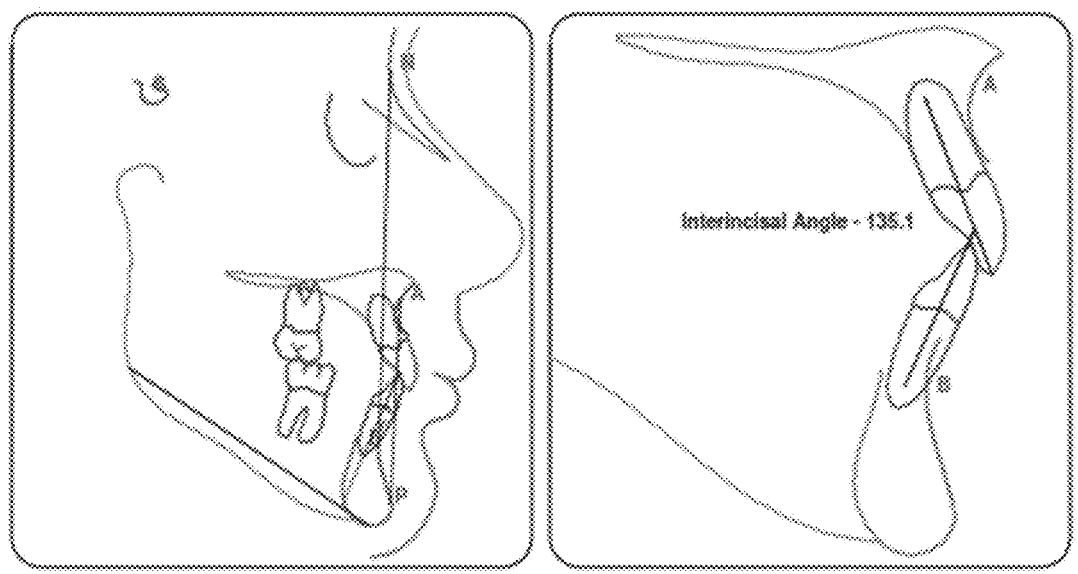

FIGS. 4 to 6 will be described below with reference to FIGS. 7 and 8. FIGS. 7 and 8 are reference views illustrating the methods of analyzing a cephalometric image according to the embodiments.

The apparatus 100 for analyzing a cephalometric image may perform learning by using at least one learning image, on which a landmark point is indicated, in order to perform the methods of analyzing a cephalometric image according to the embodiments. In this case, the apparatus 100 for analyzing a cephalometric image may preprocess the learning image. For example, the apparatus 100 for analyzing a cephalometric image may apply CLAHE parameters, a Gaussian blur, or warping to the learning image, may scale the learning image in the X axis and/or the Y axis, may reduce or crop the learning image, may increase resolution by changing pixel values, or may perform the like. The apparatus 100 for analyzing a cephalometric image, which has been trained with the preprocessed learning image, may extract a landmark point from a cephalometric image.

As shown in FIG. 4, the apparatus 100 for analyzing a cephalometric image may acquire a cephalometric image at step S410.

The apparatus 100 for analyzing a cephalometric image may acquire a cephalometric image from an apparatus (not shown) capable of radiography or computed tomography scan for a head because it includes the apparatus or is communicating with the apparatus.

Furthermore, the apparatus 100 for analyzing a cephalometric image may receive an image from an external device (not shown), and may acquire the received image as a cephalometric image.

In connection with this, when acquiring an image, the apparatus 100 for analyzing a cephalometric image may determine whether or not the acquired image is a cephalometric image.

In other words, according to an embodiment, the apparatus 100 for analyzing a cephalometric image may determine whether or not the acquired image is a cephalometric image, and may determine that a cephalometric image has been acquired only when it is determined that the acquired image is a cephalometric image.

For example, when it is determined by the analysis of the acquired image that an image of a head is not included, it may be determined that the image is not a cephalometric image. In other words, for example, when it is determined by the analysis of the acquired image that an image of teeth is not included, it may be determined that the image is not a cephalometric image.

Furthermore, according to still another embodiment, the apparatus 100 for analyzing a cephalometric image may determine whether or not the acquired image is analyzable as a cephalometric image, and may determine that a cephalometric image has been acquired only when it is determined that the acquired image is analyzable.

For example, the apparatus 100 for analyzing a cephalometric image may determine whether or not the acquired image is analyzable by analyzing the resolution, size, and/or the like of the acquired image. Accordingly, for example, when the acquired image has a resolution lower than a predetermined resolution or a size smaller than a predetermined size, it may be determined that the image is not analyzable, and thus it may be determined that a cephalometric image has not been acquired.

Furthermore, according to another embodiment, the apparatus 100 for analyzing a cephalometric image may determine that a preprocessed image is a cephalometric image after preprocessing the acquired image.

For example, when it is determined that the acquired image does not meet predetermined criteria, the apparatus 100 for analyzing a cephalometric image may modify the acquired image or may combine the acquired image with another image so that the acquired image meets the criteria. For example, the apparatus 100 for analyzing a cephalometric image may perform preprocessing by, for example, increasing the resolution of the acquired image, adjusting the brightness of the acquired image, increasing or decreasing the size of the acquired image, or performing the like.

Furthermore, according to another embodiment, when the acquired image is a raw image, the apparatus 100 for analyzing a cephalometric image may acquire a cephalometric image from the raw image.

Furthermore, according to another embodiment, the apparatus 110 for analyzing a cephalometric image may normalize the acquired cephalometric image. The apparatus 110 for analyzing a cephalometric image may determine that the normalized cephalometric image is an acquired cephalometric image.

When it is determined that the cephalometric image has been acquired as described above, the apparatus 100 for analyzing a cephalometric image may extract at least one landmark point on the cephalometric image at step S420.

For example, the apparatus 100 for analyzing a cephalometric image may extract the landmark point on the cephalometric image through geometric computation. Alternatively, for example, the apparatus 100 for analyzing a cephalometric image may extract the landmark point on the cephalometric image by using machine learning (or deep learning, or a CNN).

Alternatively, for example, the apparatus 100 for analyzing a cephalometric image may extract at least one area of interest on the cephalometric image, and may extract a landmark point within the area of interest. The apparatus 100 for analyzing a cephalometric image may use machine learning (or deep learning, or a CNN) in order to extract the area of interest, and may use machine learning (or deep learning, or a CNN) in order to extract the landmark point within the area of interest.

In connection with this, at step S420, a first point may be identified by analyzing the cephalometric image at step S510, and the first point may be verified based on a second point and the first point may be determined to be a landmark point when it is determined that the first point has been correctly extracted at step S520, as shown in FIG. 5.

In this case, the first and second points refer to respective points on the cephalometric image, are named merely to distinguish them from each other, and do not refer to specific points.

According to an embodiment, the apparatus 100 for analyzing a cephalometric image may identify the first point, assumed to be a landmark point on the cephalometric image, according to various embodiments.

According to an embodiment, the apparatus 100 for analyzing a cephalometric image may extract the first point, assumed to be a landmark point on the cephalometric image, by using geometric computation. In other words, a landmark point having no feature point on the cephalometric image or a landmark point geometrically defined on the cephalometric image may be extracted by using geometric computation. For example, a first point obtained by computing the bisection point of the mandibular plane and a ramus may be extracted as a landmark point for a gonion.

According to still another embodiment, the apparatus 100 for analyzing a cephalometric image may extract the first point, assumed to be a landmark point on the cephalometric image, by using machine learning.

According to still another embodiment, the apparatus 100 for analyzing a cephalometric image may extract the first point, assumed to be a landmark point on the cephalometric image, by using deep learning.

According to still another embodiment, the apparatus 100 for analyzing a cephalometric image may extract the first point, assumed to be a landmark point on the cephalometric image, by using a CNN. For this purpose, the apparatus 100 for analyzing a cephalometric image may acquire at least one cephalometric image on which a landmark point is indicated, and may extract the landmark point on the cephalometric image by using the image and a CNN.

For this purpose, for example, the apparatus 100 for analyzing a cephalometric image may acquire a global feature by repeating the steps of creating a feature map from an image, acquired for the learning of a CNN, through convolution, acquiring a feature by performing convolution and subsampling again on a feature acquired by performing convolution and subsampling a local feature acquired through the subsampling of the feature map, and performing convolution and subsampling again on the acquired feature, and may provide the acquired global feature as input to a general neural network (a fully connected network), thereby achieving an optimum recognition result.

Furthermore, the apparatus 100 for analyzing a cephalometric image may extract the landmark point on the cephalometric image by performing segmentation by using, for example, a CNN. Segmentation is a technique for identifying a meaningful portion on a cephalometric image. Known various types of segmentation may be applied to the embodiments described herein. For example, the distribution of pixels may be determined using a histogram, a threshold value having an optimal value may be set, and identification may be performed on a per-pixel basis. Alternatively, significant edges may be extracted, and then identification may be performed. Alternatively, an area having homogeneity may be identified.

According to still another embodiment, the apparatus 100 for analyzing a cephalometric image may extract an area of interest on the cephalometric image, and may extract a first point assumed to be a landmark point within the area of interest. The apparatus 100 for analyzing a cephalometric image may use machine learning (or deep learning, or a CNN) in order to extract the area of interest, and may use machine learning (or deep learning, or a CNN) in order to extract the first point assumed to be a landmark point within the area of interest.

According to another embodiment, the apparatus 100 for analyzing a cephalometric image sets an area within a window as an area of interest while moving the window across the cephalometric image, and may extract the first point assumed to be a landmark point within the area of interest. When the number of landmark points to be extracted from the cephalometric image is N (where N is an integer equal to or larger than 1), the apparatus 100 for analyzing a cephalometric image may perform the step of extracting a first point within an area of interest for each of the landmark points N times in order to extract the N landmark points.

Meanwhile, according to another embodiment, the apparatus 100 for analyzing a cephalometric image may extract the first point, assumed to be a landmark point, by using both machine learning and geometric computation. Accordingly, for example, when a gonion is extracted as a landmark point, the apparatus 100 for analyzing a cephalometric image may extract one of the points, extracted through machine learning and geometric computation, as a first point. For example, the apparatus 100 for analyzing a cephalometric image may extract a point, acquired using geometric computation, as a first point when the reliability of a landmark point extracted using machine learning is equal to or lower than a predetermined value.

Meanwhile, the apparatus 100 for analyzing a cephalometric image may verify the identified first point. According to an embodiment, the apparatus 100 for analyzing a cephalometric image may verify a first point, extracted using machine learning (or deep learning, or a CNN), by using geometric computation.

In this case, the verification may be performed by determining whether a first point identified using machine learning (or deep learning, or a CNN) is the same as a second point extracted using geometric computation, or may be performed by geometrically computing whether a point or organ structure near a first point extracted using machine learning (or deep learning, or a CNN) is located at a second point. For example, when a landmark point for the porion of the external auditory meatus is determined to be a first point and an articulare between the posterior cranial base surface and the condylar head or neck is determined to be a second point, it may be verified whether the first point is located at a location on the left of and above the second point, and an articulare between the posterior cranial base surface and the condylar head or neck may be verified, and the result of the verification may be represented in terms of reliability.

Additionally, the apparatus 100 for analyzing a cephalometric image may verify whether the area of interest has been correctly set by using machine learning (or deep learning, or a CNN) or geometric computation. For example, the apparatus 100 for analyzing a cephalometric image may verify whether an area of interest extracted by the detection of machine learning is an intended area of interest by classifying an image of the area of interest, or may represent whether an area of interest extracted by the detection of machine learning is an intended area of interest in terms of reliability. Alternatively, for example, the apparatus 100 for analyzing a cephalometric image may verify whether an area of interest extracted by the detection of machine learning is an intended area of interest by using a point or organ structure near the area of interest.

Furthermore, according to another embodiment, the apparatus 100 for analyzing a cephalometric image may verify a first point, geometrically extracted for a desired landmark point, by using machine learning (or deep learning, or a CNN). For example, the apparatus 100 for analyzing a cephalometric image may verify whether the first point is appropriate for a landmark point by determining whether the first point is located within a predetermined radius around a second point acquired by performing machine learning (or deep learning, or a CNN) on the cephalometric image.

When as a result of the verification using the above-described method, the extracted landmark point is not an intended landmark point or an intended landmark point has not been extracted, the apparatus 100 for analyzing a cephalometric image may extract a landmark point again.

In this case, the apparatus 100 for analyzing a cephalometric image may extract a landmark point from the existing cephalometric image again. Alternatively, the apparatus 100 for analyzing a cephalometric image may extract a landmark point by acquiring a new cephalometric image other than the existing cephalometric image and then analyzing the new cephalometric image. For this purpose, a cephalometric image may be acquired from a raw image again, or the cephalometric image may be normalized again.

As described above, the accuracy and reliability of the extracted landmark point may be increased by performing both machine learning and geometric computation. Meanwhile, when extracting the landmark point on the cephalometric image as described above, the apparatus 100 for analyzing a cephalometric image may generate an analysis image by combining the landmark point with an identification image at step S430.

In other words, the apparatus 100 for analyzing a cephalometric image may combine the cephalometric image with an identification image when converting the cephalometric image into the analysis image, and may combine the landmark point with the identification image when combining the cephalometric image with the identification image.

When the landmark point includes a plurality of landmark points, the apparatus 100 for analyzing a cephalometric image may combine the landmark points with identification images having the same shape.

Alternatively, when the landmark point includes a plurality of landmark points, the apparatus 100 for analyzing a cephalometric image may store a plurality of identification images, and may combine the landmark points with different identification images according to the locations of the landmark points.

Meanwhile, the apparatus 100 for analyzing a cephalometric image may provide the analysis image to a user at step S440.

Additionally, the apparatus 100 for analyzing a cephalometric image may determine whether to provide a report including the analysis image at step S450.

For example, the apparatus 100 for analyzing a cephalometric image may provide a report only when a user requests the provision of a report.

According to still another embodiment, the apparatus 100 for analyzing a cephalometric image may set the provision of a report, including an analysis image, as a default in a system, and may provide a report.

Furthermore, the apparatus 100 for analyzing a cephalometric image may provide a report only with respect to, for example, an analysis image having a value equal to or larger than a predetermined threshold value. For example, the apparatus 100 for analyzing a cephalometric image may provide a report only with respect to an analysis image of a patient including a head in which an identification image corresponding to a specific point is indicated at a location out of a predetermined range around the location at which the specific point is commonly indicated.

When it is determined that a report will be provided as described above, the apparatus 100 for analyzing a cephalometric image may generate a report by including the analysis image without change or by processing the analysis image and may provide the report at step S460.

In this case, according to an embodiment, the apparatus 100 for analyzing a cephalometric image may generate and provide a report so that the analysis image itself constitutes part of the report.

According to still another embodiment, the apparatus 100 for analyzing a cephalometric image may provide a report obtained by processing the analysis image.

Meanwhile, in a method of analyzing a cephalometric image according to another embodiment, the apparatus 100 for analyzing a cephalometric image may receive a raw image and extract at least one landmark point prior to acquiring a cephalometric image. In connection with this, a description will be given below with reference to FIG. 6.

The apparatus 100 for analyzing a cephalometric image may preprocess the raw image at step S610, as shown in FIG. 6. In other words, the apparatus 100 for analyzing a cephalometric image may preprocess the raw image by applying CLAHE parameters, a Gaussian blur or warping to the raw image, scaling the raw image in the X and/or Y axes, reducing or cropping a learning image, increasing resolution by changing pixel values, or performing the like.

Furthermore, the apparatus 100 for analyzing a cephalometric image may acquire a cephalometric image from the raw image at step S620.

According to an embodiment, the apparatus 100 for analyzing a cephalometric image may search for whether or not a predetermined identifier is located within a predetermined area on the raw image that is input as an analysis target.

For example, the apparatus 100 for analyzing a cephalometric image may search for whether or not a predetermined identifier recognized as an "eye socket" is located within a predetermined area on the raw image. In this case, the apparatus 100 for analyzing a cephalometric image may set an area within a window, composed of a closed curve having a specific size and shape, as the predetermined area when the window is located on the raw image. The window may set various ranges of areas while moving across the raw image.

Furthermore, for example, the apparatus 100 for analyzing a cephalometric image may use machine learning (or deep learning or a convolutional neural network (CNN)) in order to search for whether or not a predetermined identifier is located within a predetermined area on the raw image. For example, the apparatus 100 for analyzing a cephalometric image may extract a coordinate at which an identifier is located within a predetermined area by applying a CNN to the predetermined area. The coordinate may be a coordinate within a predetermined area, or may be a coordinate on the raw image.

The apparatus 100 for analyzing a cephalometric image that has extracted the coordinate of the predetermined identifier on the raw image may acquire a cephalometric image based on the extracted coordinate.

For example, when the raw image is an X-ray image of the upper half of the body of a patient, the apparatus 100 for analyzing a cephalometric image may extract three identifiers corresponding to "an eye socket," "the low jawbone," and "the nasal cavity," used to identify a cephalometric image, from the raw image. To extract the three identifiers, the apparatus 100 for analyzing a cephalometric image may extract coordinates corresponding to the identifiers while moving the window. Furthermore, the apparatus 100 for analyzing a cephalometric image may acquire a cephalometric image by setting an area, determined to be a cephalometric image, on the raw image based on the extracted coordinates. For example, the apparatus 100 for analyzing a cephalometric image may set an area, including not only the three identifiers but also predetermined ranges from the respective identifiers, as the cephalometric image.

The apparatus 100 for analyzing a cephalometric image may process the cephalometric image through the normalization of the acquired cephalometric image so that the extraction of a landmark point is facilitated. For example, the apparatus 100 for analyzing a cephalometric image may normalize the cephalometric image by changing the resolution, brightness, or the like of the cephalometric image, increasing or decreasing the size of the cephalometric image, or performing the like. Alternatively, for example, the apparatus 100 for analyzing a cephalometric image may increase the cephalometric image when the cephalometric image is a cephalometric image of an infant, or may decrease the cephalometric image when the cephalometric image is a cephalometric image of a patient having a large head.

When acquiring the cephalometric image as described above, the apparatus 100 for analyzing a cephalometric image may extract a landmark candidate point for the cephalometric image at step S630.

The landmark candidate point refers to a point that has not been verified as a point that is extracted as a landmark point.

In order to extract a landmark candidate point, the apparatus 100 for analyzing a cephalometric image may extract an area of interest on the cephalometric image, and may extract a landmark candidate point within the area of interest. The apparatus 100 for analyzing a cephalometric image may use machine learning (or deep learning, or a CNN) in order to extract the area of interest, and may use machine learning (or deep learning, or a CNN) in order to extract the landmark candidate point within the area of interest.

The area of interest may be set by moving a window across the cephalometric image or by locating a window at a fixed point on the cephalometric image.

When the number of landmark points to be extracted from the cephalometric image is N (where N is an integer equal to or larger than 1), the apparatus 100 for analyzing a cephalometric image may perform the step of extracting a landmark candidate point within an area of interest while setting the area of interest N times in order to extract the N landmark points. In this case, when a landmark point is assumed to be located at a specific location of the cephalometric image, the apparatus 100 for analyzing a cephalometric image may fix a window at the specific location, and may extract a landmark candidate point. For example, when a landmark point is located near a chin, the apparatus 100 for analyzing a cephalometric image may set an area including a chin as an area of interest, and may extract a landmark candidate point within the area of interest.

The apparatus 100 for analyzing a cephalometric image may verify the extracted landmark candidate point at step S640.

According to an embodiment, the apparatus 100 for analyzing a cephalometric image may verify whether a landmark point acquired using machine learning (or deep learning, or a CNN) has deviated from a set location by additionally performing geometric computation. According to still another embodiment, the apparatus 100 for analyzing a cephalometric image may verify whether the extracted landmark candidate point has been correctly extracted by verifying whether the porion of the external auditory meatus or point A (a point that is defined on the side of a head, and the most protruding portion of the curved bone part that ranges from the front tip of a nose to the maxillary pterygoid process) has been correctly extracted as a landmark point.

When the landmark candidate point extracted through the above-described verification is not a correctly extracted point or when there is not an intended landmark point even when the extracted landmark candidate point has been verified, the apparatus 100 for analyzing a cephalometric image may acquire a cephalometric image from a raw image again or acquire a new cephalometric image by normalizing the acquired cephalometric image again, may extract a landmark candidate point from the new cephalometric image, and may verify the extracted landmark candidate point. In other words, the apparatus 100 for analyzing a cephalometric image may extract an accurate landmark point by performing steps S620 to S640 again.

Meanwhile, when extracting the landmark point on the cephalometric image as described above, the apparatus 100 for analyzing a cephalometric image may generate an analysis image by combining the landmark point with an identification image, and may provide the analysis image or a report. In connection with this, steps S430 to S460 of FIG. 6 are the same as steps S430 to S460 of FIG. 4, and thus descriptions thereof will be omitted.

FIGS. 7 and 8 are views showing examples that are provided by the apparatus 100 for analyzing a cephalometric image as reports.

For example, the cephalometric state of a patient may be intuitively represented by connecting identification images on an analysis image with line segments. For example, there may be provided a report in which the state of lower incisors in the head of a patient has been analyzed by connecting identification images with line segments, as shown in FIG. 8.

Furthermore, a report may be provided to a user by using a method of additionally providing pieces of information corresponding to respective identification images indicated on an analysis image. For example, the measured values of a head may be provided using an identification image. As shown in FIG. 8, the interincisal angles of a patient may be computed and indicated along with the mean value thereof.

Furthermore, for example, as shown in FIG. 7, there may be provided a report including an image in which an analysis image has been combined with another image.

The term "unit" used herein refers to, but is not limited to, a software component or a hardware component, such as a field programmable gate array (FPGA) or application specific integrated circuit (ASIC), that performs a specific task. A unit may be configured to reside on an addressable storage medium, and may be configured to be executed on one or more processors. Accordingly, a unit may include, by way of example, components, such as software components, object-oriented software components, class components and task components, processes, functions, attributes, procedures, subroutines, segments of program code, drivers, firmware, microcode, circuitry, data, databases, data structures, tables, arrays, and variables.

The functions provided in components and units may be combined into a smaller number of components and units, or may be separated into additional components and units.

Furthermore, components and units may be configured to be executed on one or more central processing units (CPUs) inside a device or security multimedia card.

The method of analyzing a cephalometric image according to the embodiment described in conjunction with FIGS. 4 to 6 may be implemented in the form of a computer-readable medium that stores instructions and data that can be executed by a computer. In this case, the instructions and the data may be stored in the form of program code, and may generate a predetermined program module and perform a predetermined operation when executed by a processor. Furthermore, the computer-readable medium may be any type of available medium that can be accessed by a computer, and may include volatile, non-volatile, separable and non-separable media. Furthermore, the computer-readable medium may be a computer storage medium. The computer storage medium may include all volatile, non-volatile, separable and non-separable media that store information, such as computer-readable instructions, a data structure, a program module, or other data, and that are implemented using any method or technology. For example, the computer storage medium may be a magnetic storage medium such as an HDD, an SSD, or the like, an optical storage medium such as a CD, a DVD, a Blu-ray disk or the like, or memory included in a server that can be accessed over a network.

Furthermore, the method of analyzing a cephalometric image according to the embodiment described in conjunction with FIGS. 4 to 6 may be implemented as a computer program (or a computer program product) including computer-executable instructions. The computer program includes programmable machine instructions that are processed by a processor, and may be implemented as a high-level programming language, an object-oriented programming language, an assembly language, a machine language, or the like. Furthermore, the computer program may be stored in a tangible computer-readable storage medium (for example, memory, a hard disk, a magnetic/optical medium, a solid-state drive (SSD), or the like).

Accordingly, the method of analyzing a cephalometric image according to the embodiment described in conjunction with FIGS. 4 to 6 may be implemented in such a way that a computer program, such as that described above, is executed by a computing device. The computing device may include at least part of a processor, memory, a storage device, a high-speed interface accessing the memory and a high-speed expansion port, and a low-speed interface accessing a low-speed bus and a storage device. These components are connected to each other by means of various buses, and may be mounted on a common motherboard or by means of another appropriate method.

In this case, the processor may process instructions in a computing device. For example, these instructions may be instructions that are stored in memory or a storage device and that are used to display graphics information adapted to provide a graphical user interface (GUI) to an external input/output device, for example, a display connected to a high-speed interface. As another embodiment, a plurality of processors and/or a plurality of buses may be appropriately used along with a plurality of pieces of memory and memory forms. Furthermore, the processor may be implemented as a chipset that includes chips including a plurality of independent analog and or digital processors.

Furthermore, the memory stores information in a computing device. For example, the memory may include a volatile memory unit or a set of volatile memory units. As another example, the memory may include a non-volatile memory unit or a set of non-volatile memory units. Furthermore, the memory may be, for example, another type of computer-readable medium, such as a magnetic or optical disk.

Additionally, the storage device may provide a large-sized storage space to a computing device. The storage device may be a computer-readable medium or a configuration including such a medium. For example, the storage device may include devices included in a storage area network (SAN), or may include another component. The storage device may be a floppy disk device, a hard disk device, an optical disk device, a tape device, flash memory, or another semiconductor memory device or device array similar thereto.

According to some of the above-described embodiments, there are proposed the apparatus and method for analyzing a cephalometric image.

According to some of the above-described embodiments, there are proposed the apparatus and method for analyzing a cephalometric image, which provide accurate analysis results based on a cephalometric image, thereby helping a medical team determine an expected operation site of a patient.

According to some of the above-described embodiments, there are proposed the apparatus and method for analyzing a cephalometric image, which rapidly provide the results of the analysis of a cephalometric image, thereby preventing a necessary operation from being delayed.

According to some of the above-described embodiments, there are proposed the apparatus and method for analyzing a cephalometric image, which provide a report easily understandable by not only a medical team but also a patient by processing the results of the analysis of a cephalometric image once.

The advantages that can be obtained from the disclosed embodiments are not limited to the above-described advantages, and other advantages that have not been described above will be clearly understood from the foregoing description by those having ordinary knowledge in the art to which the present invention pertains.

The above-described embodiments are merely illustrative, and it will be understood by those having ordinary knowledge in the art to which the present invention pertains that modifications and variations may be easily made without departing from the technical spirit and essential features of the present invention. Therefore, it should be appreciated that the above-described embodiments are illustrative but are not limitative in all aspects. For example, each component which is described as being configured in a single form may be practiced in a distributed form. In the same manner, components that are described as being configured in a distributed form may be practiced in an integrated form.

The scope of the present invention is defined by the attached claims, rather than the foregoing detailed description. Furthermore, all modifications and variations derived from the meanings, scope and equivalents of the claims should be construed as falling within the scope of the present invention.

What is claimed is:

1. An apparatus for analyzing a cephalometric image, the apparatus comprising:
   a controller configured to extract a landmark point on a cephalometric image, and to generate an analysis image; and
   memory configured to store the generated analysis image,
   wherein the controller is further configured to set an area of interest on the cephalometric image, and to identify a first point, in order to extract the landmark point, by performing machine learning for the cephalometric image within the area of interest,
   wherein the area of interest is verified by the controller performing geometric computation based on an image near the area of interest or by the controller performing machine learning for the area of interest.

2. The apparatus of claim 1, wherein the controller is further configured to acquire a learning image in order to perform learning based on the learning image, to extract the landmark point, and to then generate the analysis image.

3. The apparatus of claim 1, wherein the controller is further configured to identify a landmark point by analyzing the cephalometric image, and to extract the landmark point by verifying the identified landmark point.

4. The apparatus of claim 1, wherein the controller is further configured to extract the landmark point by verifying the first point based on a second point determined through geometric computation for the cephalometric image.

5. A method by which an apparatus for analyzing a cephalometric image analyzes a cephalometric image, the method comprising:
   extracting a landmark point on a cephalometric image; and
   generating an analysis image based on the extracted landmark point,
   wherein extracting the landmark point comprises:
   setting an area of interest on the cephalometric image; and
   identifying a first point, in order to extract the landmark point, by performing machine learning for the cephalometric image within the area of interest,
   wherein the area of interest is verified by the apparatus performing geometric computation based on an image near the area of interest or by the apparatus performing machine learning for the area of interest.

6. The method of claim 5, wherein extracting the landmark point comprises:
   identifying a landmark point by analyzing the cephalometric image; and
   extracting the landmark point by verifying the identified landmark point.

7. The method of claim 5, wherein extracting the landmark point comprises extracting the landmark point by verifying the first point based on a second point determined through geometric computation for the cephalometric image.

8. A non-transitory computer-readable storage medium having stored thereon a computer program for causing an apparatus for analyzing a cephalometric image to analyze a cephalometric image, the program causing the apparatus to execute:
   extracting a landmark point on a cephalometric image; and
   generating an analysis image based on the extracted landmark point,
   wherein extracting the landmark point comprises:
   setting an area of interest on the cephalometric image; and
   identifying a first point, in order to extract the landmark point, by performing machine learning for the cephalometric image within the area of interest,
   wherein the area of interest is verified by the apparatus performing geometric computation based on an image near the area of interest or by the apparatus performing machine learning for the area of interest.

* * * * *